United States Patent
Smeyak et al.

(10) Patent No.: US 6,782,601 B2
(45) Date of Patent: Aug. 31, 2004

(54) METHOD OF MAKING INTERACTIVE INFORMATION CLOSURE

(75) Inventors: Larry Smeyak, Lafayette, IN (US); Timothy Carr, Carmel, IN (US); Mark Powell, Crawfordsville, IN (US); John Ziegler, Carmel, IN (US)

(73) Assignee: Alcoa Closure Systems International, Crawfordsville, IN (US)

( * ) Notice: Subject to any disclaimer, the term of this patent is extended or adjusted under 35 U.S.C. 154(b) by 0 days.

(21) Appl. No.: 10/224,177

(22) Filed: Aug. 20, 2002

(65) Prior Publication Data

US 2003/0061705 A1 Apr. 3, 2003

Related U.S. Application Data

(60) Provisional application No. 60/318,731, filed on Sep. 13, 2001.

(51) Int. Cl.[7] ................................. H01Q 17/00
(52) U.S. Cl. ........................ 29/601; 29/600; 29/832; 29/846; 29/848; 29/858; 29/593; 235/492; 257/673; 257/674; 257/735; 343/873
(58) Field of Search ........................ 29/858, 601, 600, 29/846, 847, 854, 840, 832, 860, 593; 235/492, 487; 228/180.21; 428/42.2; 340/572.8, 36.9; 343/700 MS, 873; 257/673, 674, 666, 735 T; 438/119, 455

(56) References Cited

U.S. PATENT DOCUMENTS 5,566,441 A  10/1996  Marsh et al.
5,635,917 A  6/1997  Todman
5,786,626 A  7/1998  Brady et al.
5,818,019 A  10/1998  Irwin, Jr. et al.
5,971,282 A  10/1999  Rollender et al.
6,212,741 B1  4/2001  Cahill
6,226,619 B1  5/2001  Halperin et al.
2003/0061705 A1 *  4/2003  Smeyak et al. ............... 29/601

FOREIGN PATENT DOCUMENTS

| DE | 19723847 | 5/1998 |
| DE | 19731969 | 8/1998 |
| EP | 0 619 243 A1 | 10/1994 |
| EP | 0991013 | 4/2000 |
| WO | WO 94/27117 | 11/1994 |
| WO | WO 01/03188 A1 | 7/1999 |
| WO | WO 01/17893 A2 | 3/2001 |
| WO | PCT/US02/15508 | 3/2002 |

* cited by examiner

Primary Examiner—Minh Trinh
(74) Attorney, Agent, or Firm—Stephen D. Geimer; Tracey D. Beiriger

(57) ABSTRACT

A method of making an interactive information package, including an interactive information closure including a radio frequency identification device, contemplates that a microelectronics assembly be provided, and positioned on an associated substrate for positioning adjacent an inside surface of the top wall portion of the closure of the package. In one embodiment, the mounting substrate is provided in the form of a disc-shaped sealing liner for the closure. In an alternate embodiment, the mounting substrate is laminated to an associated sealing liner, with the substrate, and microelectronics assembly positioned thereon, inserted together with the sealing liner into the associated molded closure.

9 Claims, 2 Drawing Sheets

METHOD OF MAKING INTERACTIVE INFORMATION CLOSURE

This application claims the benefit of provisional application No. 60/318,731 filed Sep. 13, 2001.

TECHNICAL FIELD

The present invention relates generally to a method of making an interactive information package comprising a closure and container, with the package including a microelectronics assembly, and more particularly to a method of making such a package by employing a mounting substrate for disposition of the microelectronics assembly adjacent to the inside surface of a top wall portion of the closure of the package.

BACKGROUND OF THE INVENTION

The development of radio frequency identification, often called RDID, integrated circuitry has permitted use of such devices in a wide range of applications. Use of such arrangements in a product package comprising a closure and container has a wide variety of applications, including product promotions, storage and dissemination product information including product processing, and quality assurance, including tamper-indication, by monitoring the conditions within the product package. U.S. patent application Ser. No. 60/291,916, filed May 18, 2001, hereby incorporated by reference, discloses a product package including a closure and container, wherein the closure includes a microelectronics assembly configured for interaction with associated radio frequency "writers" and scanners.

A microelectronics assembly such as disclosed in the above-referenced patent application is configured for radio frequency interaction by the provision of a suitable radio frequency identification (RFID) integrated circuit, an antenna, and one or more interconnections operatively connecting the circuit and the antenna. The microelectronics assembly may include one or more microsensors, as well as a self-contained power source.

Cost-effective use of such interactive devices in packages including closures and containers requires that the microelectronics assembly be efficiently and economically positioned in the package, preferably adjacent the inside surface of a top wall portion of the package's closure. In the past, it has been common practice to supply microelectronics, and in particular RFID tags, embedded in or attached to a plastic or paper substrate. Such a plastic or paper substrate is typically supplied in large rolls to manufacturers of so-called "smart" products, such as smart credit cards and the like. Suitable machinery has been developed whereby the microelectronics assemblies can be efficiently inserted into products, such as by detachment from the substrate, or alternatively, by insertion of a portion of the substrate along with the microelectronics assembly into the product being manufactured.

The present invention is directed to a method of making an interactive information package, including a closure and container, wherein a microelectronics assembly is mounted on a mounting substrate which is subsequently inserted into the package's closure for use in association with the contents of the package.

SUMMARY OF THE INVENTION

A method of making an interactive information closure for a package contemplates the provision of a microelectronics assembly and a mounting substrate upon which the microelectronics assembly is positioned. The substrate is then inserted into a plastic closure of the package for disposition adjacent to the inside surface of the top wall portion thereof. As disclosed herein, the mounting substrate may comprise a sealing liner for the plastic closure, which engages the associated package container to form a seal. Alternatively, the mounting substrate, with the microelectronics package positioned thereon, can be laminated to a disc-shaped sealing liner for the closure, with the laminated assembly thereafter inserted into the closure.

A method of making an interactive information closure embodying the principles of the present invention comprises the steps of molding a plastic closure having a top wall portion, and an annular depending skirt portion. The method further includes providing a microelectronics assembly which includes a radio frequency identification (RFID) integrated circuit and antenna, and one or more interconnections operatively connecting the circuit and the antenna.

The present method further includes providing a mounting substrate, and positioning the microelectronics assembly on the substrate. The mounting substrate, with the microelectronics assembly thereon, is thereafter inserted into the plastic closure for disposition adjacent to the inside surface of the top wall portion. As noted, the mounting substrate may be configured to provide the sealing liner for the plastic closure, and is thus configured for sealing cooperation with an associated container of the package after the closure is applied thereto after the container is filled with its contents. Alternatively, the present invention contemplates providing a disc-shaped sealing liner for the closure, and laminating the mounting substrate, with the microelectronics assembly thereon, to the sealing liner. The inserting step of the present method thus includes inserting the laminated sealing liner and mounting substrate into the plastic closure together.

The present invention contemplates various techniques for effecting the desired mounting of the microelectronics assembly on the substrate. It is contemplated that the antenna and interconnections of the assembly can be printed on the substrate with electrically conductive inks, with the printing steps selected from the group consisting of ink jet printing, silk screen printing, and offset printing. Alternatively, the antenna and interconnections can be formed on the substrate by thin film deposition utilizing evaporation or sputtering. Etching and/or laser machining of the thin film is performed to form the antenna and interconnections.

Alternatively, the antenna and interconnections of the microelectronics assembly can be formed on the mounting substrate by lamination, followed by etching and/or laser machining of the lamination to form the antenna and interconnections.

The RFID integrated circuit of the microelectronics assembly can be positioned on the substrate by various techniques. Such techniques include positioning the integrated-circuit active-side-down on the substrate with the pads of said integrated circuit directly connected to the antenna or interconnections by soldering, stud-bump bonding or with conductive adhesives, or alternatively, active-side-up on a substrate with connection from the pads of the integrated circuit to the antenna or interconnections made by wire bonding. By an alternative technique, the integrated circuit can be positioned on the substrate, with a planarization layer formed over the integrated circuit Formation of one or more openings in the planarization layer is effected, with formation of the antenna on the planarization layer, and formation of the interconnections through the openings in the planarization layer. The antenna and interconnections can be formed by metal deposition followed by photolithography, with the formation of openings in the planarization layer effected by either photolithography or laser machining.

For some applications, it can be desirable to form the electronics package on the mounting substrate, by printing the integrated circuit with semi-conductor inks and the antenna, and the interconnections with electrically-conductive inks on the substrate.

An apparatus is disclosed herein for effecting insertion of a substrate-mounted microelectronics assembly into an associated closure cap. It is contemplated that such an apparatus not only effects the insertion of the microelectronics assembly and substrate into the closure, but that the apparatus be configured to effect reading of information from, and writing of information onto, the assembly, with the apparatus most importantly testing the installed microelectronics assembly prior to shipment.

Other features and advantages of the present invention will become readily apparent from the following detailed description, the accompanying drawings, and the appended claims.

DETAILED DESCRIPTION

Figure 1:
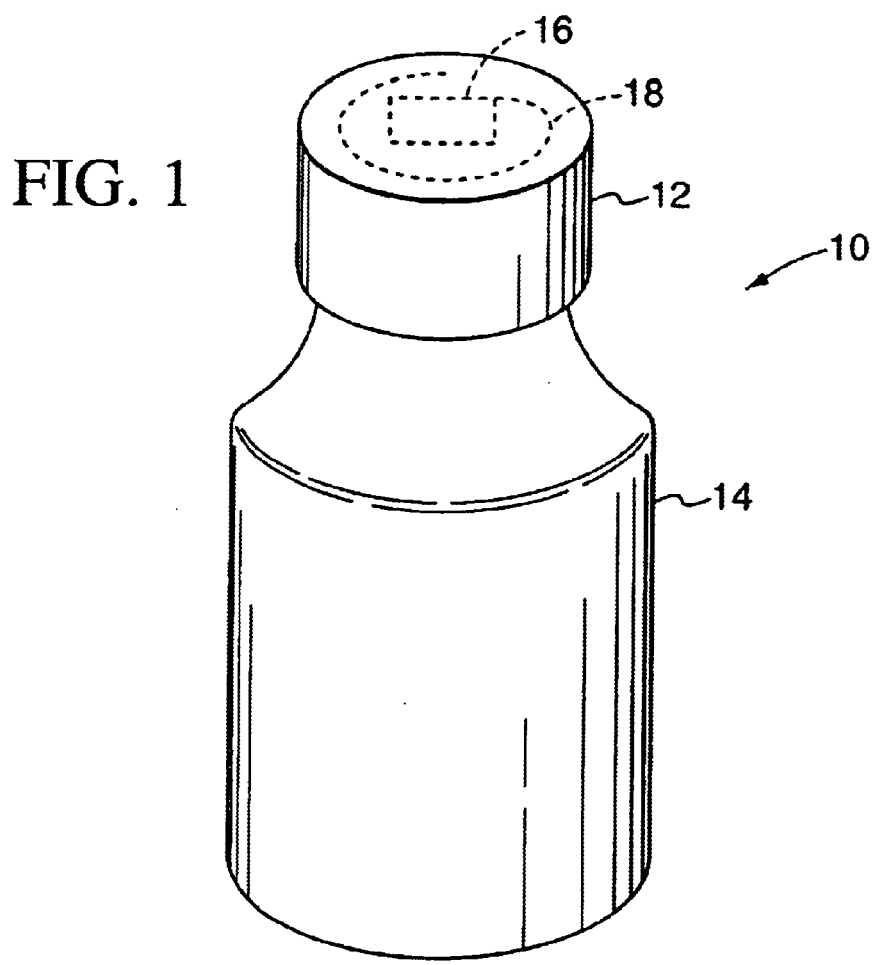
FIG. 1 is a diagrammatic view of an interactive information package of the type that can be formed in accordance with the present invention, including a plastic closure and associated container.

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiments disclosed herein.

The present invention is directed to a method of making an interactive information package including a plastic closure and container, wherein a radio frequency identification integrated circuit and associated antenna are disposed within the package, preferably by disposition on or at the interior surface of the package closure. The arrangement of the present package facilitates its use for a variety of applications, in including product promotion, storage and dissemination of product information including product processing information, and product quality assurance, including tamper-evidence. Use of packages formed in accordance with the present invention permits efficient inventory control, by permitting product purchases to be efficiently tracked without resorting to optical scanning of bar codes and the like.

As illustrated in FIG. 1, the package 10 which can be formed in accordance with the present invention comprises plastic closure 12 and an associated container 14 to which the closure can be secured, such as by cooperating, inter-engaged thread formations. Plastic closure 12 can be injection molded or compression molded, with U.S. Pat. No. 4,497,765, hereby incorporated by reference, disclosing a method and apparatus for efficiently compression-molding closures of this type.

Figure 2:
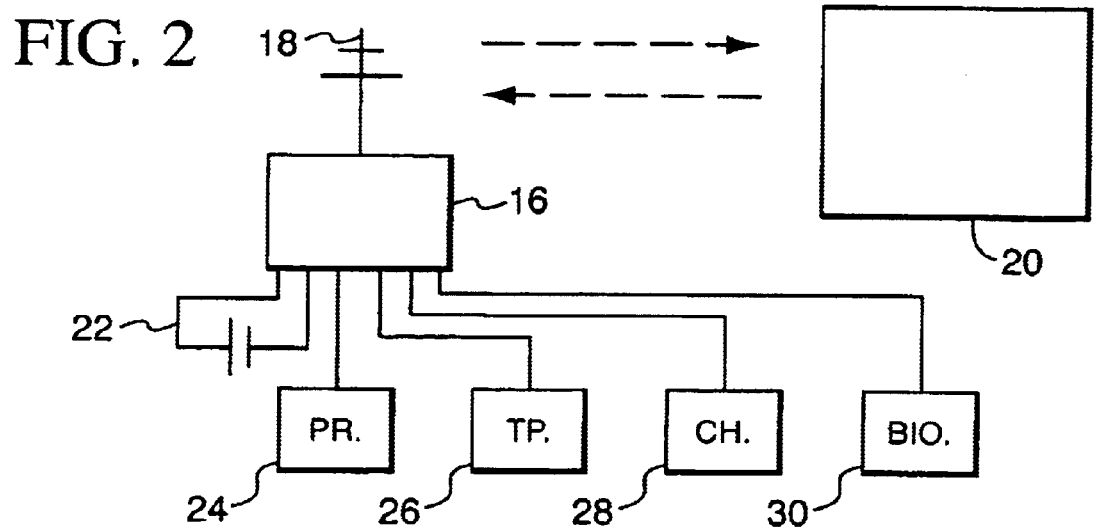
FIG. 2 is a diagrammatic view of a radio frequency integrated circuit system for providing a wide variety of applications, including product promotions, storage and dissemination product information including product processing, and quality assurance, including tamper-indication, by monitoring the conditions within the product package.

The package 10 includes a radio frequency identification integrated circuit 16 (sometimes referred to as a radio frequency identification (RFID) device or tag) disposed within the package 10, preferably by disposition on or at the interior surface of the closure 12, that is, adjacent the inside surface of a top wall portion of the closure. The arrangement includes an antenna 18 operatively connected to the integrated circuit 16, with the antenna cooperating with the integrated circuit to permit the integrated circuit to be externally powered without physical connection of a power supply thereto. The antenna 18 provides the desired radio frequency interface with an associated radio frequency input/output device 20 (FIG. 2) which can be configured to provide remote input to and/or reading and retrieval of electronic information carried by the integrated circuit 16.

For purposes of the present disclosure, the term microelectronics, and microelectronics assembly, includes, but is not limited to RFID supporting electronics, antenna to support radio frequency communication, micro-sensors, and micro-power sources.

In accordance with the present disclosure, it is contemplated that the integrated circuit 16 and antenna 18, and any associated components, including interconnections with the integrated circuit, be positioned within the closure 12 by disposition of the electronic components (referred to herein as a microelectronics assembly) by the provision of a substrate which is inserted into the closure 12. As will be further described, the mounting substrate for the microelectronics assembly can be inserted into the closure 12 for disposition adjacent the inside surface of the top wall portion thereof. It is contemplated that the mounting substrate can be provided in the form of a sealing liner for the closure, or alternatively, that the mounting substrate be laminated to an associated sealing liner, with the substrate and liner (with the microelectronics assembly secured thereto) inserted as a unit into the associated closure 12.

In the embodiment illustrated in FIG. 1, external powering of the integrated circuit precludes the need for an internal power supply operatively connected to the integrated circuit for providing electrical power thereto. However, for some configurations of the present package (such as providing tamper-evidence indication or capturing continuous historical data on package parameters such as pressure and/or temperature), it can be desirable to provide a compact power supply 22, such as diagrammatically illustrated in FIG. 2, operatively connected to the integrated circuit 16.

The microelectronics assembly of the package can be configured to include one or more different types of compact-size (i.e., micro) sensing devices. Such sensing devices may include, by way of example, a pressure sensor 24, a temperature sensor 26, a chemical sensor 28 for sensing the presence of chemicals such as oxygen, and/or a biological sensor 30 for sensing the presence of microorganisms within the package 10. The configuration of the present package with one or more of the internal sensing devices greatly enhances versatile use of the present package for quality assurance functions, including tamper-evidence, brand protection, and anti-counterfeiting. An array of sensors can be provided for certain applications, with the array preferably integrated with radio frequency integrated circuit 16. The provision of one or more sensors permits direct assessment of the quality state of the packaged goods.

U.S. patent application Ser. No. 60/291,916, hereby incorporated by reference, further describes use of the package 10 for specific applications.

It is contemplated that the microelectronics assembly used in practicing the present invention can be positioned on a mounting substrate inserted into closure 12, apart from any sealing liner or like component provided in the closure. The present invention particularly contemplates that the mounting substrate for the microelectronics be provided in the form of, or be secured to, a sealing liner for the closure 12. For plastic closures lined with loose disc liners inserted into pre-molded closures (as opposed to in situ molding of a liner), closure manufacturers typically use thin sheet lining material ranging from 0.015 to 0.030 inches thick, depending upon the particular closure design. This lining material is supplied in large rolls, and is typically fed into punching machines that punch circular discs from the lining material, and substantially simultaneously insert the punched discs into closure shells. The remaining "skeleton" is typically re-ground and returned to the material supplier for recycling and inclusion in future rolls of lining material.

As noted, the present invention is directed to a method of making an interactive information closure, which method contemplates the molding of a plastic closure having a top wall portion and an annular depending skirt portion, such as illustrated closure 12. The present invention further contemplates that a microelectronics assembly, including an RFID integrated circuit, an antenna, and one or more interconnections operatively connecting the circuit and the antenna, be provided, with a mounting substrate provided for effecting insertion of the microelectronics package into the associated closure.

Figure 3:
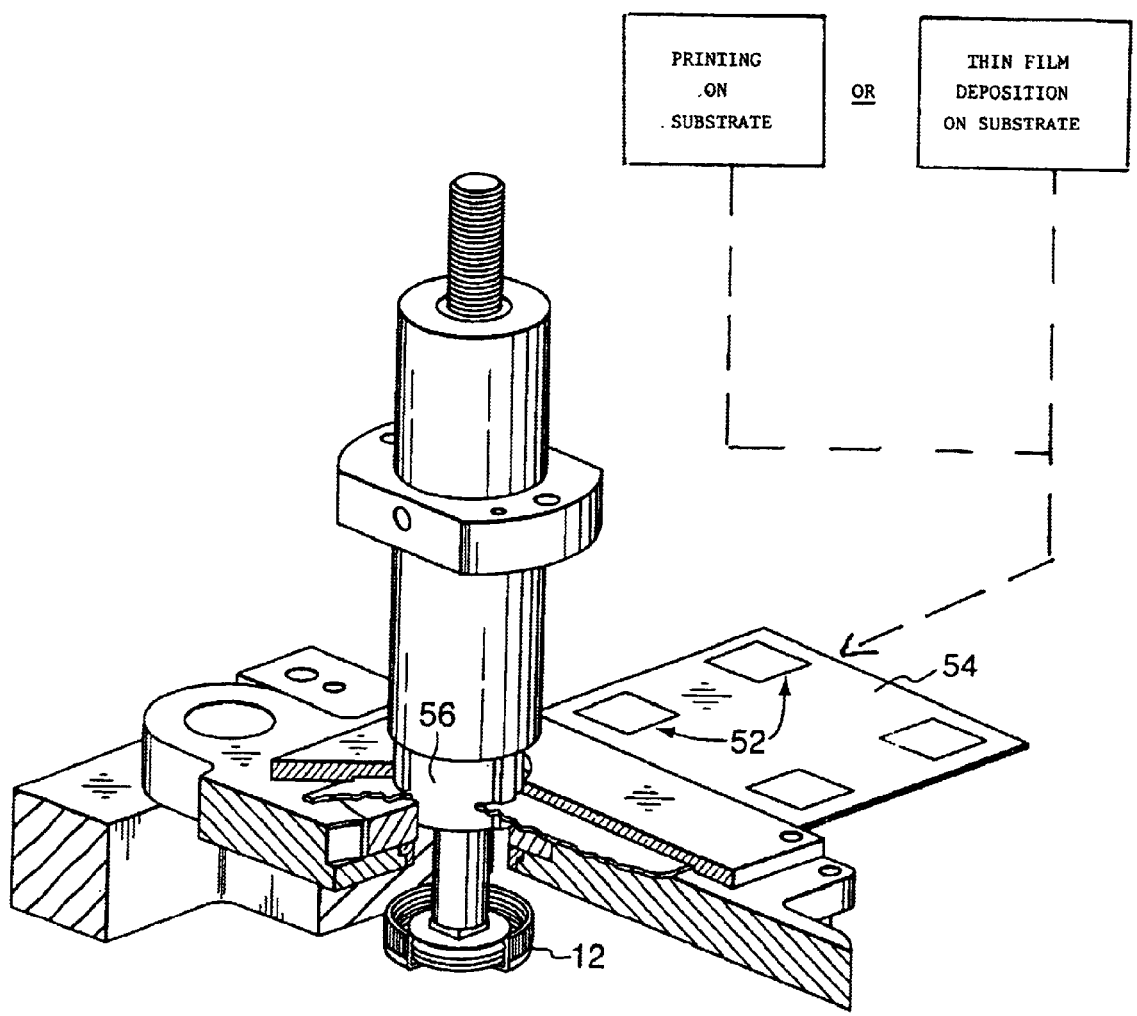
FIG. 3 is a diagrammatic view of an apparatus for practicing the method of the present invention for insertion of a microelectronics assembly and mounting substrate into an associated closure.

With reference to FIG. 3, an apparatus 50 is illustrated whereby microelectronics packages 52 are positioned on a sheet of mounting substrate material 54 with the apparatus 50 including a punch 56 for cutting the mounting substrate material, and inserting each individual mounting substrate, with microelectronics positioned thereon, into an associated closure 12. In this illustrated embodiment, it is contemplated that the mounting substrate material 54 be provided in the form of lining material for the formation of a mounting substrate in the form of a sealing liner for the closure 12. For those applications in which the closure 12 does not require a sealing liner, the mounting substrate, and associated microelectronics, can be similarly inserted into the associated closure 12, and suitably adhered to the inside surface of the top wall portion of the closure, such as by a suitable adhesive or the like. For these applications, the microelectronics are positioned between the top wall of the closure and the substrate, and are thus isolated from the contents of the package, in accordance with FDA requirements.

As noted, for some applications it can be desirable to provide the mounting substrate for the microelectronics separately from the disc-shaped sealing liner for the closure 12. For such applications, the present invention contemplates that the mounting substrate be laminated to the disc-shaped sealing liner for the closure, with the laminated assembly thus formed being inserted into the associated closure such that the mounting substrate (and microelectronics thereon) are positioned in the closure between the sealing liner and the inside surface of the top wall portion of the closure. In such an arrangement, the sealing liner thus acts to provide the desired sealing engagement between the closure assembly and the associated container, with the microelectronics assembly thus securely positioned within the package, yet isolated from the contents therein, in accordance with FDA requirements.

The present invention contemplates that various techniques can be employed for providing the antenna 18, and associated interconnections, on the mounting substrate for the electronics assembly. In one form, the antenna and interconnections are printed on the substrate with electrically conductive inks, with the printing steps selected from the group consisting of ink jet printing, silk screen printing, and offset printing. Alternatively, the antenna and interconnections can be formed by thin film deposition utilizing evaporation or sputtering on the mounting substrate, with etching or laser machining of the thin film effected to form the antenna and interconnections.

Other techniques can be employed in accordance with the present invention for formation of the antenna and interconnections of the microelectronics assembly. The antenna and interconnections can be formed by lamination on the mounting substrate, with the lamination etched or laser machined for formation of the antenna and interconnections. Laser "writing" can be employed through the use of organometallic gas which forms metal deposits when subjected to laser light.

Mounting of the integrated circuit 16 on the mounting substrate can also be effected in various ways. As is known by those skilled in the art, the integrated circuit can be positioned active-side-down on the mounting substrate with connection from the pads on the integrated circuit made directly to the antenna or interconnection by soldering, stud-bump bonding or with a conductive adhesive, or active-side-up on the substrate with connection from the pads on the integrated circuit made directly to the antenna or interconnection with wire bonds. Formation of the microelectronics assembly can include the steps of first positioning the integrated circuit on the mounting substrate, and forming a planarization layer over the integrated circuit. One or more openings are then formed in the planarization layer, such as by photolithography or laser machining. The antenna is then formed on the planarization layer, and interconnections formed through the openings in the layer. The antenna and interconnections can be formed by metal deposition followed by photolithography.

It is within the purview of the present invention that the microelectronics assembly can be positioned on the mounting substrate by printing the integrated circuit with semiconductor inks as well as the associated antenna and interconnections with electrically-conductive inks directly on the.

To facilitate efficient use of the present interactive information package, it is contemplated that the apparatus 50 employed for insertion of the microelectronics and mounting substrate into the associated closure be a so-called "smart machine", that is, capable of reading information from, and writing information onto, the microelectronics assembly. It is particularly contemplated that this apparatus be configured for testing the installed microelectronics prior to shipment of the interactive information package.

From the foregoing, it will be observed that numerous modifications and variations can be effected without departing from the true spirit and scope of the novel concept of the present invention. It is to be understood that no limitation with respect to the specific embodiments disclosed herein is intended or should be inferred. The disclosure is intended to cover, by the appended claims, all such modifications as fall within the scope of the claims.

What is claimed is:

1. A method of making an interactive information closure, comprising the steps of:

providing a plastic closure having a top wall portion, and an annular depending skirt portion;

providing a microelectronics assembly, including an RFID integrated circuit, an antenna, and one or more interconnections operatively connecting said circuit and said antenna;

providing a mounting substrate, and positioning said microelectronics assembly on said substrate;

providing a punch;

positioning said plastic closure in operative association with said punch; and inserting said mounting substrate with said microelectronics package thereon into said plastic closure for disposition adjacent to the inside surface of said top wall portion by advancing said punch through a portion of said substrate having said microelectronics assembly thereon to cut said substrate, and insert said microelectronics assembly and an associated portion of substrate into said plastic closure.

2. The method of making an interactive information closure in accordance with claim 1, wherein:

said mounting substrate provides a sealing liner for said plastic closure.

3. The method of making an interactive information closure in accordance with claim 1, including:

printing said antenna and said interconnections on said substrate with electrically-conductive inks.

4. The method of making an interactive information closure in accordance with claim 3, wherein:

said printing step is selected from the group consisting of ink jet printing, silk screen printing, and offset printing.

5. The method of making an interactive information closure in accordance with claim 1, including:

forming said antenna and said interconnections by thin film deposition on said mounting substrate.

6. The method of making an interactive information closure in accordance with claim 5, including:

etching said thin film to form said antenna and interconnections.

7. The method of making an interactive information closure in accordance with claim 1, wherein:

said step of positioning said microelectronics assembly on said mounting substrate including printing said integrated circuit with semi-conductor inks, and said antenna and said interconnections with electrically-conductive inks on said substrate.

8. The method of making an interactive information closure in accordance with claim 1, including:

adhering said microelectronics assembly and said associated portion of said substrate to an inside surface of said top wall portion of said closure.

9. The method of making an interactive information closure in accordance with claim 1, wherein:

said inserting step includes positioning said microelectronics assembly between an inside surface of said top wall portion of said closure and said associated portion of said substrate.

* * * * *